(12) United States Patent
Tomsheck et al.

(10) Patent No.: US 9,587,201 B2
(45) Date of Patent: Mar. 7, 2017

(54) SELF-LUBRICATING POLYMER COMPOSITION AND METHOD OF LUBRICATING AN ARTICLE

(71) Applicant: POLYONE CORPORATION, Avon Lake, OH (US)

(72) Inventors: Chad R. Tomsheck, Pittsburgh, PA (US); Martin J. Paisner, Columbia, SC (US); Timothy R. Dawsey, Pittsburg, KS (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 14/646,140

(22) PCT Filed: Nov. 15, 2013

(86) PCT No.: PCT/US2013/070297
§ 371 (c)(1),
(2) Date: May 20, 2015

(87) PCT Pub. No.: WO2014/081629
PCT Pub. Date: May 30, 2014

(65) Prior Publication Data
US 2015/0299605 A1    Oct. 22, 2015

Related U.S. Application Data

(60) Provisional application No. 61/729,087, filed on Nov. 21, 2012.

(51) Int. Cl.
| | | |
|---|---|---|
| C10M 161/00 | (2006.01) | |
| H01B 7/18 | (2006.01) | |
| G02B 6/02 | (2006.01) | |
| C08L 67/00 | (2006.01) | |
| C08L 69/00 | (2006.01) | |

(Continued)

(52) U.S. Cl.
CPC ....... *C10M 161/00* (2013.01); *G02B 6/02395* (2013.01); *H01B 7/183* (2013.01); *H01B 7/1805* (2013.01); *C08L 67/00* (2013.01); *C08L 69/00* (2013.01); *C08L 77/02* (2013.01); *C09D 183/04* (2013.01); *G02B 6/4438* (2013.01);

(Continued)

(58) Field of Classification Search
CPC .. G02B 6/02395; C10M 161/00; H01B 7/183; H01B 7/1805
See application file for complete search history.

(56) References Cited

U.S. PATENT DOCUMENTS

| | | |
|---|---|---|
| 6,518,357 B1 | 2/2003 | Rajagopalan et al. |
| 6,638,587 B1 | 10/2003 | Wang et al. |

(Continued)

FOREIGN PATENT DOCUMENTS

EP    0 407 061 A1    1/1991

*Primary Examiner* — Jerry Rahll
(74) *Attorney, Agent, or Firm* — Michael J. Sambrook

(57) ABSTRACT

A self-lubricating polymer composition is provided. The self-lubricating composition comprises a polymer matrix formed from a homopolymer or copolymer selected from the group consisting of a polyamide, a polyester, a polycarbonate, and combinations thereof, and a particulate siloxane slip agent substantially homogeneously distributed in the polymer. Also provided are self-lubricating articles, such as electrical wire and optical cable, coated with the self-lubricating polymer composition.

18 Claims, 2 Drawing Sheets

(51) Int. Cl.
  *C08L 77/02* (2006.01)
  *H01B 3/30* (2006.01)
  *H01B 3/42* (2006.01)
  *C09D 183/04* (2006.01)
  *G02B 6/44* (2006.01)
  *H01B 11/18* (2006.01)

(52) U.S. Cl.
  CPC ............... *H01B 3/305* (2013.01); *H01B 3/42* (2013.01); *H01B 11/18* (2013.01)

(56) References Cited

U.S. PATENT DOCUMENTS

| | | |
|---|---|---|
| 7,411,129 B2 | 8/2008 | Kummer et al. |
| 7,557,301 B2 | 7/2009 | Kummer et al. |
| RE41,388 E | 6/2010 | Brown et al. |
| 7,749,024 B2 | 7/2010 | Chambers et al. |
| 8,043,119 B2 | 10/2011 | Kummer et al. |
| 8,382,518 B2 | 2/2013 | Chambers et al. |
| 8,701,277 B2 | 4/2014 | Kummer et al. |
| 8,710,141 B2 | 4/2014 | Andres et al. |
| 2008/0194736 A1 | 8/2008 | Lu |
| 2010/0230131 A1 | 9/2010 | Han et al. |
| 2012/0031642 A1* | 2/2012 | Chambers ........... B29C 47/0016 174/110 N |

\* cited by examiner

US 9,587,201 B2

SELF-LUBRICATING POLYMER COMPOSITION AND METHOD OF LUBRICATING AN ARTICLE

BACKGROUND

The present invention relates generally to a self-lubricating polymer composition that may be useful as a coating for an article, related methods of lubricating an article and using the lubricated article.

Examples of coated articles include electrical cable and fiber optic cable. Generally, known electrical cables include a conductor core wire and an insulative jacket disposed peripherally about the conductor core. At least some known conductor cores are constructed from copper, silver, gold, and aluminum, and at least some known insulative jackets are constructed from a polymeric material such as polyethylene, polypropylene, polyamide, or polyesters. While these known polymeric materials have desirable electrical resistivity, they may also have a high coefficient of friction making installation of the electrical cable through tight spaces and/or small openings, such as conduits, ducts, and building framing a challenge. For instance, the wires may become impinged and difficult to pull without excessive force.

One known method of reducing the coefficient of friction of electrical cable includes applying a pulling lubricant to the exterior surface of the electrical cable. Known pulling lubricants include gels, wax-based compositions, and polytetrafluoroethylene (PTFE)-based compositions. However, these known pulling lubricants must generally be applied to the exterior surface of the entire length of each electrical cable, which may be a time-consuming and tedious process.

Another known method of reducing the coefficient of friction includes forming a polymer composition comprising a lubricating material capable of migration or permeation within a formed polymer matrix and disposing it about the conductor core thereby forming an insulative jacket thereon. At least one known lubricating polymer composition is composed primarily of a nylon material and either an erucamide, a flowable silicone-based slip agent, or a PTFE-based slip agent. In this known configuration, the slip agent migrates or permeates to the outer surface of the insulative jacket as the wire is pulled during installation. Generally, the slip agents are included in the lubricating polymer composition at greater than about 1% by weight, and more typically from about 3-7% by weight. However, including slip agents at such high loads may result in reduced durability of the electrical wiring, increased costs, and susceptibility to failure at extreme temperatures.

Therefore a need exists for improvements for reducing the coefficient of friction between cables and contact surfaces of conduits, ducts, and building framing in order to avoid the problems associated with prior art cables including protracted installation time, cost associated with external lubricants, damage to cable attributed to impingement and/or excessive pulling force, and burn-through damage to cable jackets caused by frictional heating generated by contact between the cable exterior surface and a second surface (e.g., conduit or duct).

BRIEF DESCRIPTION

In one aspect, a self-lubricating polymer composition is provided. The composition comprises a polymer matrix formed from a homopolymer or copolymer selected from the group consisting of a polyamide, a polyester, a polycarbonate, and combinations thereof, wherein the polymer is further selected from a homopolymer, a copolymer and combinations thereof. The composition also comprises a particulate siloxane slip agent substantially homogeneously distributed in the polymer. The siloxane concentration is between about 0.05 percent by weight and 1 percent by weight based on the total weight of the polymer and siloxane, the average particle size of the particulate siloxane is from about 0.5 µm to about 25 µm.

In another aspect, a self-lubricating cable is provided. The cable comprises an electrical conductor and a coating disposed peripherally about the electrical conductor. The coating comprises (i) a homopolymer or copolymer selected from the group consisting of a polyamide, a polyester, a polycarbonate, and combinations thereof, wherein the polymer is further selected from a homopolymer, a copolymer and combinations thereof and (ii) a particulate siloxane slip agent. The siloxane is substantially homogeneously distributed in the polymer, the siloxane concentration is between about 0.05 percent by weight and 1 percent by weight based on the total weight of the polymer and siloxane, the average particle size of the particulate siloxane is from about 0.5 µm to about 25 µm.

In another aspect, a method of lubricating an article is provided. The method comprises forming a lubrication mixture that comprises a homopolymer or copolymer selected from the group consisting of (i) a polyamide, a polyester, a polycarbonate, and combinations thereof, wherein the polymer is further selected from a homopolymer, a copolymer and combinations thereof and (ii) a particulate siloxane slip agent substantially homogeneously distributed in the polymer. The siloxane concentration is between about 0.05 percent by weight and 1 percent by weight based on the total weight of the polymer and siloxane, and the average particle size of the particulate siloxane is from about 0.5 µm to about 25 µm. The method also comprises coating the article with the lubrication mixture.

In yet another aspect, a method of installing a self-lubricating cable in a passageway is provided. The method comprises selecting a cable as hereinbefore described and installing the electrical cable in the passageway.

In yet another aspect, a method of providing a cable for installation through building passageways is provided. The method comprises forming a cable as hereinbefore described and providing the cable for installation.

DETAILED DESCRIPTION

Figure 1:
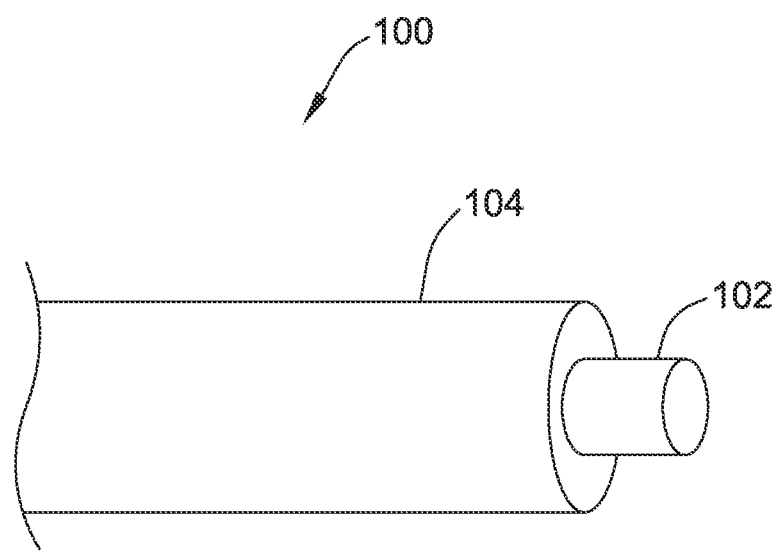
FIG. 1 is a perspective view of an exemplary self-lubricating electrical cable.

The present invention generally provides for self-lubricating polymer compositions. The present invention further provides for self-lubricating articles, such as electrical cable, comprising the self-lubricating polymer disposed peripherally about the article. The present invention still further provides methods for preparing said self-lubricating articles. The present invention yet further provides for a method of installing self-lubricating cables in a passageway. As used herein, "cable" is used broadly to refer to any coated (e.g., jacketed) electrical conductor and includes, for instance and not in a limiting sense, Thermoplastic High Heat-resistant Nylon (THHN) wire, Thermoplastic Fixture Nylon (TFN)

wire, Thermoplastic Heat and Water resistant Nylon (THWN) wire, coaxial cable, multicore cable, single cable, and communications cable (e.g., telephone, cable television and Ethernet). Although special reference herein is made to electrical cable, it is to be understood that the self-lubricating coatings of the present invention are suitable for use with any article that is subjected to frictional forces during installation and/or use, such as fiber optic cable.

In the various embodiments of the present invention, the self-lubricating polymer compositions comprise a polymer matrix formed from a polyamide homopolymer or a co-polymer thereof and a loading of no more than about 1 percent by weight of a siloxane slip agent. In some embodiments the slip agent is substantially homogeneously distributed in the polymer matrix. As used herein, "substantially homogeneously distributed" refers to (i) a slip agent concentration per unit volume of polymer within a core section of a formed polymer matrix and (ii) a slip agent concentration per unit volume of polymer within a section of formed polymer matrix in an exterior portion of the formed polymer matrix, wherein the slip agent concentration differs by no more than about 20% or no more than about 10% between the core section and the exterior portion. Generally, the siloxane slip agent may have a cage structure characterized as having substantial three dimensional symmetry. In some embodiments, the siloxane may be characterized as having a generally spherical, substantially spherical, or uniformly spherical shape. As further used herein, "spherical" can optionally refer to a plurality of particles having an average sphericity of from about 0.9 to 1.0 from about 0.91 to 1.0 from about 0.92 to 1.0, from about 0.93 to 1.0, or from about 0.94 to 1.0 wherein sphericity ($\Psi$) is defined by the equation:

$$\Psi = \pi^{1/3}(6V_p)^{2/3}/A_p$$

wherein $V_p$ is the volume of the particle and $A_p$ is the surface area of the particle.

Under one theory of operation, and without being bound by any particular theory, it is believed that the siloxane particles remain substantially fixed within the polymer and do not generally or substantially move (e.g., migrate or permeate) within the formed polymer matrix. For example, it is believed that the siloxane particles do not generally move during installation of an electrical wire having an insulator coating formed from the polymer matrices of the present invention. It is believed that the general inability of the siloxane particles to move within a formed polymer matrix is the result of a combination of at least two factors. First, the siloxane slip agents possess a melting point temperature and a glass transition temperature that is sufficiently high such that the siloxane will not liquefy or otherwise become flowable at the elevated temperatures experienced during electrical cable installation resulting from pulling-related frictional heating. Second, it is believed that the siloxane slip agents have an average particle size that is larger than the molecular free volume within a formed polymer matrix thereby essentially fixing the slip agent in place. Because the slip agent does not generally migrate from within the formed polymer matrix to the surface thereof, the polymer composition is believed to achieve its lubricating characteristics as the polymer surface is microabraded during installation, thereby continuously exposing siloxane slip agent. It is believed that a very low siloxane slip agent loading of no more than 1 wt. % results in lubrication properties, such as a low coefficient of friction and pulling force, comparable to prior art coatings having loadings in excess of 1 wt. % of particulate PTFE or a liquid or flowable lubricant that migrates or permeates within a formed polymer matrix to the wire coating surface.

As such, embodiments of the present invention provide for a self-lubricating polymer composition that facilitates improved durability when compared to known coatings for electrical wire and optical fibers.

Homopolymer/Copolymer

The polymer composition may comprise any suitable condensation homopolymer or copolymer that enables the self-lubricating coating to function as described herein. Examples of condensation polymers within the scope of the present invention include polyamides, polyesters, polycarbonates, and combinations thereof. Polymer compositions within the scope of the present invention include homopolymers and copolymers comprising polyamides, polyesters and/or polycarbonates.

Non-limiting examples of suitable polyamides include poly ε-caprolactam (Nylon PA 6), hexamethylenediamine/adipic acid (Nylon 66), caprolactam/hexamethylenediamine/adipic acid (Nylon PA 6/66), hexamethylenediamine/adipic acid/sebacic acid (Nylon PA 66/610), hexamethylenediamine/terephthalic acid (PA 6T), paraphenylenediamine/terephthalic acid (Kevlar), m-xylylenediamine/adipic acid (PA mXD6), hexamethylenediamine/isophthalic acid (PA 6I), poly(ε-caprolactam/tetramethylene terephthalamide) (PA6/4T), poly(ε-caprolactam/hexamethylene terephthalamide) (PA6/6T), poly(ε-caprolactam/decamethylene terephthalamide) (PA6/10T), poly(ε-caprolactam/dodecamethylene terephthalamide) (PA6/12T), poly(hexamethylene decanediamide/hexamethylene terephthalamide) (PA610/6T), poly(hexamethylene dodecanediamide/hexamethylene terephthalamide) (PA612/6T), poly(hexamethylene tetradecanediamide/hexamethylene terephthalamide) (PA614/6T), poly(ε-caprolactam/hexamethylene isophthalamide/hexamethylene terephthalamide) (PA6/6I/6T), poly(2-methylpentamethylene hexanediamide/hexamethylene hexanediamide/hexamethylene terephthamide) (PA D6/66/6T), poly(hexamethylene terephthamide/2-methylpentamethylene terephthamide) (PA 6TDT), poly(hexamethylene hexanediamide/hexamethylene terephthamide (PA66/6T), poly(hexamethylene terephthamide/hexamethylene isophthamide (PA6T/6I), poly(hexamethylene hexanediamide/hexamethylene terephthamide/hexamethylene isophthamide (PA66/6T/6I), poly(decamethylene decanediamide/decamethylene terephthalamide) (PA1010/10T) poly(decamethylene decanediamide/dodecamethylene decanediamide/decamethylene terephthalamide/dodecamethylene terephthalamide (PA1010/1210/10T/12T), poly(11-aminoundecanamide/tetramethylene terephthalamide) (PA11/4T), poly(11-aminoundecanamide/hexamethylene terephthalamide) (PA11/6T), poly(11-aminoundecanamide/decamethylene terephthalamide) (PA11/10T), poly(11-aminoundecanamide/dodecamethylene terephthalamide) (PA11/12T), poly(12-aminododecanamide/tetramethylene terephthalamide) (PA12/4T), poly(12-aminododecanamide/hexamethylene terephthalamide) (PA12/6T), poly(12-aminododecanamide/decamethylene terephthalamide) (PA12/10T), poly(dodecamethylene dodecanediamide/dodecamethylene dodecanediamide/dodecamethylene terephthalamide)) (PA1212/12T), poly(p-phenylene terephthalamide), poly(m-phenylene terephthalamide), poly(m-phenylene isophthalamide), polydodecaneamide (PA12), poly(tetramethylene adipamide) (PA46), and mixtures or blends thereof. In some embodiments, the polymer is nylon. In some other embodiments, the polymer is selected from Nylon 6 and Nylon 66.

Non-limiting examples of suitable polyesters include polycaprolactone (PCL), polyethylene terephthalate (PET), polybutylene terephthalate (PBT), polyethylene naphthalate (PEN), 4-hydroxybenzoic acid/6-hydroxynaphthalene-2-carboxylic acid (Vectran), polypropylene terephthalate (PPT), polyhexamethylene terephthalate (PHT), polypropylene naphthalate (PPN), polybutylene naphthalate (PBN), polycyclohexanedimethylene terephthalate (PCT), polyhydroxybenzoate (PB), polyethylene terephthalate glycol-modified (PETG) and combinations thereof. Non-limiting examples of suitable polycarbonates include, but are not limited to, polyphthalate carbonate, poly(hexamethyl carbonate) glycol, and combinations thereof.

Lubricant

The polymer composition may comprise any suitable siloxane slip agent that enables the self-lubricating coating to function as described herein. In some embodiments, the siloxane is a cross-linked siloxane. In some embodiments, the siloxane may be a silsesquioxane having the chemical formula $RSiO_{3/2}$ where R is a hydrocarbon. In some embodiments, the hydrocarbon is a $C_{1-10}$ hydrocarbyl, a $C_{1-4}$ hydrocarbyl or a $C_{1-2}$ hydrocarbyl. In one embodiment, the siloxane may be methylsilsesquioxane (MSQ). Examples of siloxanes include Tospearl® 105, 120, 130, 145, 240, 1110A, 2000 and 3000.

In any of the various embodiments of the present invention, a plurality of siloxane-based slip agent particles may be characterized by particle size, specific surface area and/or sphericity. In some embodiments, the siloxane-based slip agent may have an average particle size of about 0.5 μm, 1 μm, 2 μm, 3 μm, 4 μm, 5 μm, 6 μm, 7 μm, 8 μm, 9 μm, 10 μm, 11 μm, 12 μm, 15 μm, 20 μm or 25 μm, and ranges thereof, such as from about 0.5 μm to about 25 μm, from about 1.0 μm to about 20 μm, from about 1 μm to about 15 μm, from about 2.0 μm to about 12.5 μm, from about 2.0 μm to about 11 μm, from about 2.5 μm to about 10 μm, from about 3 μm to about 8 μm, from about 3.5 μm to about 7.5 μm, or from about 4 μm to about 6 μm. The siloxane-based slip agent may be further characterized by a specific surface area of about 10 $m^2/g$, about 20 $m^2/g$, about 30 $m^2/g$, about 40 $m^2/g$, about 50 $m^2/g$, about 60 $m^2/g$, about 70 $m^2/g$, about 80 $m^2/g$, about 90 $m^2/g$ or about 100 $m^2/g$, and ranges thereof, such as from about 10 to about 100 $m^2/g$, from about 10 to about 100 $m^2/g$, from about 10 to about 70 $m^2/g$, from about 10 to about 50 $m^2/g$, from about 10 to about 30 $m^2/g$, from about 20 to about 100 $m^2/g$, from about 20 to about 70 $m^2/g$, from about 20 to about 50 $m^2/g$ or from about 20 to about 30 $m^2/g$. The siloxane-based slip agent may further be characterized as having a generally spherical, substantially spherical, or uniformly spherical shape. In some embodiments a plurality of the siloxane particles are characterized as having an average sphericity of from about 0.9 to about 1.0 from about 0.91 to 1.0 from about 0.92 to 1.0, from about 0.93 to 1.0, or from about 0.94 to 1.0.

Electrical Conductor Having a Self-Lubricating Coating

Figure 2:
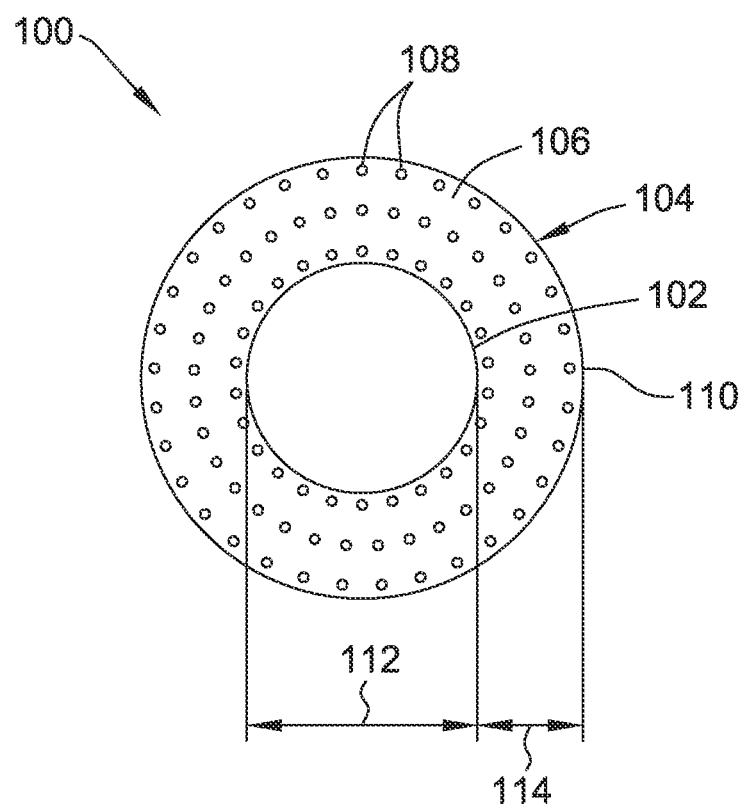
FIG. 2 is an axial cross-sectional view of the electrical cable shown in FIG. 1.

FIG. 1 is a perspective view of an exemplary self-lubricating electrical cable 100, and FIG. 2 is an axial cross-sectional view of electrical cable 100 shown in FIG. 1. In the exemplary embodiment shown in FIG. 2, electrical cable 100 includes an electrical conductor 102 and a coating 104 disposed peripherally about electrical conductor 102. Coating 104 comprises a polymer 106 as described above, and a particulate siloxane slip agent 108 that is substantially homogenously distributed in polymer 106.

In any of the various embodiments of the present invention, polymer 106 may comprise at least about 90% of coating 104 by weight, or at least about 92.5 wt. %, or at least about 95 wt. %, or at least about 98 wt. %, at least about 99 wt. % or at least about 99.5 wt. %. Furthermore, in any of the various embodiments of the present invention, the siloxane-based slip agent 108 concentration may comprise less than about 1% by weight of coating 104 based on the total weight of the polymer and siloxane, such as about 0.05 wt. %, about 0.1 wt. %, about 0.2 wt. %, about 0.3 wt. %, about 0.4 wt. %, about 0.5 wt. %, about 0.6 wt. %, about 0.7 wt. %, about 0.8 wt. % or about 0.9 wt. %, and ranges thereof, such as between about 0.05 and 1 wt. %, from about 0.1 to about 0.9 wt. %, from about 0.1 to about 0.5 wt. % by weight, from about 0.2 to about 0.5 wt. % by weight, or from about 0.2 to about 0.3 wt. %. Electrical conductors are known in the art and include wire formed from copper or aluminum, and may be stranded wire or a solid (single) wire.

In the exemplary embodiment, electrical conductor 102 has a diameter 112, and coating 104 has a thickness 114. In any of the various embodiments of the present invention, coating thickness 114 may be about 0.01 cm, about 0.025 cm, about 0.05 cm, about 0.1 cm, about 0.15 cm, about 0.2 cm, about 0.25 cm, or greater, and ranges thereof, such as from about 0.01 to about 0.25 cm, from about 0.01 to about 0.2 cm, from about 0.1 to about 0.25 cm, or from about 0.1 to about 0.2 cm.

In some embodiments, coating 104 may further comprise any suitable additive that enables electrical cable 100 to function as described herein. For example, suitable additives include, but are not limited to, an anti-blocking agent, an anti-oxidant, a UV stabilizer, an anti-static agent, a flame retardant, an anti-microbial agent, a processing aid, and a coloring agent.

In some optional embodiments, not depicted in FIG. 1 or FIG. 2, the electrical cable may further comprise one or more additional layers, such as an insulation layer, disposed between the exterior surface of electrical conductor 102 and the interior surface of coating 104. Insulators are known and include polyvinylchloride (PVC).

The siloxane-based slip agent facilitates reducing the coefficient of friction of coating 104. In any of the various embodiment of the present invention, slip agent 108 facilitates reducing the coefficient of friction of an outer surface 110 of coating 104. Particularly, the siloxane-based slip agent reduces the pulling resistance for electrical cable having a self-lubricating coating as described herein. In some embodiments, coated cables of the present invention are characterized as having an amount of force required to pull said cable through a conduit arrangement made from 1 inch galvanized steel electrical metallic tubing including about 28.5 feet of straight conduit and four 90 degree bends and having a final 5.5 foot long straight section that is no more than 25% greater, 10% greater, equal to, at least 10% less or at least 25% less than the force required to pull a similar comparative cable of the same size and type differing only with respect to the particulate slip agent, wherein the comparative cable comprises 1 wt. %, 2 wt. %, 3 wt. %, 4 wt. %, 5 wt. %, 6 wt. %, 7 wt. %, 8 wt. %, 9 wt. % or 10 wt. %, and ranges thereof, such as from 1 to 7 wt. % or from 1 to 3 wt. % of a slip or lubrication agent other than particulate siloxane, such as polytetrafluorethylene (such as PTFE T807 or PTFE NF 119N), erucamide, or a flowable non-particulate silicone. In one embodiment, the comparative cable contains from 1 wt. % to 3 wt. % polytetrafluorethylene slip agent. In some other embodiments, cables of the present invention have the characteristic that an amount of force required to pull said cable through a conduit arrangement made from 1 inch galvanized steel electrical metallic tubing including about 28.5 feet of straight conduit and four 90 degree bends and having a 5.5 foot long final straight section is at least 10%, 15%, 20%, 25% or 30% less than the force required to pull a non-lubricated cable of the same cable type and size through the conduit arrangement.

Methods of Preparation and Use

A method of lubricating an article is also described herein. The method includes forming a lubrication mixture that comprises a homopolymer or copolymer as described above, and a particulate siloxane slip agent substantially homogeneously distributed in the polymer. In one embodiment, the lubrication mixture is formed by preparing a masterbatch of the self-lubricating polymer composition that comprises the polymer and a high loading of siloxane-based slip agent. The slip agent loading may be 5 wt. %, 10 wt. %, 15 wt. %, 20 wt. %, 25 wt. %, 30 wt. %, 35 wt. %, 40 wt. %, 45 wt. % or 50 wt. %, and ranges thereof. The masterbatch may then be diluted by adding additional polymer and/or additives such that a desired concentration of siloxane-based slip agent is contained within the polymer composition. In another embodiment, a predetermined amount of polymer, siloxane-based slip agent, and additives may be combined to form a polymer blend that has a desired concentration of siloxane-based slip agent contained therein.

In one embodiment, the method also includes coating the article with the self-lubricating composition. The article may be coated with the lubrication mixture by any suitable process that enables the coated article to function as described herein. For instance, extrusion or lamination techniques known to those skilled in the art are suitable for coating articles with the self-lubricating compositions of the present invention. In some embodiments, the article is an electrical conductor and the self-lubricating composition is extruded onto the electrical conductor.

In other embodiments, electrical cables of the present invention may be installed in passageways such as conduit, pipe, and/or construction. Advantageously, in preferred embodiments installation is done without the addition of a pulling lubricant (e.g., a silicone spray or lubricant) to an exterior surface of the electrical cable.

EXAMPLES

The following non-limiting simulations are provided to further illustrate the present invention.

As shown by the formulations shown in Table 1, six (6) polymer and particulate combinations were produced and tested. Comparative formulations A and B were prepared from nylon-6 and PTFE wherein formulation A contained 97 wt. % nylon-6 and 3 wt. % PTFE T807, and formulation B contained 99 wt. % nylon-6 and 1 wt. % PTFE NF 119N by weight. Inventive formulations C-F were prepared from masterbatches containing 85 wt. % nylon 6 polymer and 15 wt. % siloxane by preparing a melt from the masterbatch and additional nylon 6 with agitation. Formulation C contained 99.9 wt. % nylon-6 and 0.1 wt. % TOSPEARL® 120 having an average particle size of 2 μm and a specific surface area of 30 m²/g. Formulation D contained 99.9 wt. % nylon-6 and 0.1 wt. % TOSPEARL® 1110A having an average particle size of 11 μm and a specific surface area of 18 m²/g. Formulation E contained 99.8 wt. % nylon-6 and 0.2 wt. % TOSPEARL® 1110A. Formulation F contained 99.9 wt. % nylon-6 and 0.1 wt. % TOSPEARL® 3120 having an average particle size of 12 μm and a specific surface area of 18 m²/g.

TABLE 1

| Formulation | Nylon-6 | PTFE T807 | PTFE NF 119N | Tospearl® 120 | Tospearl® 1110A | Tospearl® 3120 |
|---|---|---|---|---|---|---|
| A | 97 | 3 | — | — | — | — |
| B | 99 | — | 1 | — | — | — |
| C | 99.9 | — | — | 0.1 | — | — |
| D | 99.9 | — | — | — | 0.1 | — |
| E | 99.8 | — | — | — | 0.2 | — |
| F | 99.8 | — | — | — | — | 0.2 |

Coefficient of Friction Pull Test

Six THHN electrical wire ("cable" as defined herein) 1/0 American Wire Gauge (AWG) samples, designated as A through F, were prepared by coating bare copper wire with formulations A through F, respectively. Comparative electrical cables A and B contained PTFE lubricant and cables C through F are electrical cables of the present invention. Each of electrical cable A through F presented a highly glossy appearance.

Electrical cables A through F were evaluated for pulling resistance using the pull test described above that measured the amount of force required to pull an electrical cable through a conduit arrangement comprising straight sections and elbows. In this test, electrical cables A through F were attached to a metal pulling tape that was threaded through the conduit arrangement. A pulling rope was attached to the other end of the pulling tape and a cable puller was used to pull the cable arrangement through the conduit. The rope was threaded through a pulley arrangement that used a load cell to monitor rope tension in the final 5.5 foot straight section. This tension was continuously logged and averaged to give an average pulling force for the pull. Electrical cables A-D were subjected to one test run each and cables E and F were subjected to three test runs each.

The pull test results are presented in Table 2 below. Cables A and B required 75.4 and 72.7 pounds of force, respectively, to be pulled through the last section of the conduit arrangement. Cables C and D required 78.8 and 76.5 pounds of force, respectively, to be pulled through the last section of the conduit arrangement. The three test runs of cable E indicated pulling forces of 75.3, 75.6 and 86.9 pounds of force. The three test runs of cable F indicated pulling forces of 87.9, 79.8 and 98.6 pounds of force. It is believed that the 98.6 pound result is an outlier resulting from a testing anomaly.

TABLE 2

| | A | B | C | D | E | F |
|---|---|---|---|---|---|---|
| 1 | 75.4 lbs | 72.7 lbs | 78.8 lbs | 76.5 lbs | 75.3 lbs | 87.9 lbs |
| 2 | — | — | — | — | 75.6 lbs | 79.8 lbs |
| 3 | — | — | — | — | 86.9 lbs | 98.6 lbs |

Accordingly, with the exception of test runs E-3, F-1, and F-3, the self-lubricating polymer compositions as described herein produced substantially equivalent pull test results when compared to the prior art PTFE-based slip agent polymer compositions having particulate loadings on the order of from 5× to 30× greater than the compositions falling within the scope of the present invention. For example, the pull test force difference between cable A (having 3 wt. % PTFE) and cable D (having 0.1 wt. % TOSPEARL 1110A) was only 1.1 pounds. Cable E (having 0.2 wt. % TOSPEARL 1110A) exhibited better pull test result than cable A.

As shown by the experimental results, self-lubricating polymer compositions described herein exhibit substantially equivalent pull test results when compared to known polymer compositions even though the present self-lubricating compositions comprised significantly less slip agent by weight.

This written description uses examples to disclose embodiment of the present invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A self-lubricating polymer composition, the composition comprising:
    a polymer matrix formed from a nylon; and
    a particulate siloxane slip agent substantially homogeneously distributed in the polymer,
    wherein the siloxane concentration is between about 0.05 percent by weight and 1 percent by weight based on the total weight of the polymer and siloxane, the average particle size of the particulate siloxane is from about 0.5 μm to about 25 μm.

2. The composition of claim 1, wherein the nylon is selected from nylon 6 and nylon 66.

3. The composition of claim 1, wherein the siloxane is a silsesquioxane of the formula $RSiO_{3/2}$, wherein R is $C_{1-10}$ hydrocarbyl.

4. The composition of claim 1, wherein the siloxane is methylsilsesquioxane.

5. The composition of claim 1 wherein a plurality of siloxane particles are characterized as having an average sphericity of from about 0.9 to 1.0.

6. The composition of claim 1 wherein the three dimensional conformation of the siloxane particles is generally spherical, substantially spherical, or uniformly spherical.

7. The composition of claim 1, wherein the siloxane concentration is from about 0.1 percent by weight to about 0.5 percent by weight based on the combined weight of the polymer and the siloxane.

8. The composition of claim 1, wherein the average particle size of the particulate siloxane is from about 1 μm to about 15 μm.

9. The composition of claim 1, wherein the nylon concentration is at least 90 percent by weight.

10. The composition of claim 1, wherein the particulate material does not migrate within the formed polymer matrix.

11. The composition of claim 1, wherein the particulate material does not react with the polymer.

12. The composition of claim 1 wherein a cable formed by disposing the composition of claim 1 about an electrical conductor or optical cable has the characteristic that an amount of force required to pull said cable through a conduit arrangement made from 1 inch galvanized steel electrical metallic tubing including about 28.5 feet of straight conduit and four 90 degree bends and having a 5.5 foot long final straight section is no more than 25% greater than the force required to pull a similar comparative cable of the same size and type differing only with respect to the particulate slip agent, wherein the comparative cable comprises from 1 wt. % to 3 wt. % of a particulate polytetrafluorethylene slip agent substantially homogeneously distributed in the polymer and no particulate siloxane slip agent.

13. The composition of claim 1 wherein a cable formed by disposing the composition of claim 1 about an electrical conductor or optical cable has the characteristic that an amount of force required to pull said cable through a conduit arrangement made from 1 inch galvanized steel electrical metallic tubing including about 28.5 feet of straight conduit and four 90 degree bends and having a 5.5 foot long final straight section is at least 25% less than the force required to pull a non-lubricated cable of the same cable type and size through the conduit arrangement.

14. A self-lubricating cable comprising:
    (i) an electrical conductor or an optical cable; and
    (ii) a coating comprising the self-lubricating polymer composition of claim 1 disposed peripherally about the electrical conductor or optical cable.

15. A method of lubricating an article, the method comprising:
    (a) forming a lubrication mixture comprising the self-lubricating polymer composition of claim 1; and
    (b) coating the article with the lubrication mixture.

16. The method of claim 15 further comprising at least one insulator layer disposed between the article and the coating.

17. The method of claim 15, wherein the article is an electrical conductor or an optical cable.

18. The method of claim 15 wherein the lubrication mixture is extruded onto an exterior surface of the article.

* * * * *